US006676015B2

(12) United States Patent
So

(10) Patent No.: US 6,676,015 B2
(45) Date of Patent: Jan. 13, 2004

(54) MEDIA SENSING METHOD FOR AUTOMATIC MEDIA DISPENSER

(75) Inventor: Sang Young So, Jeollabuk-Do (KR)

(73) Assignee: LG N-Sys Inc., Seoul (KR)

( * ) Notice: Subject to any disclaimer, the term of this patent is extended or adjusted under 35 U.S.C. 154(b) by 0 days.

(21) Appl. No.: 10/231,224

(22) Filed: Aug. 30, 2002

(65) Prior Publication Data

US 2003/0042300 A1 Mar. 6, 2003

(30) Foreign Application Priority Data

Sep. 3, 2001 (KR) ........................................ 2001/53877

(51) Int. Cl.[7] ................................................ G06F 17/60
(52) U.S. Cl. ....................................................... 235/379
(58) Field of Search ................................ 235/379, 381, 235/435, 439, 443, 446; 902/13, 14; 271/227, 261, 262, 263, 258.01, 265.01, 265.02, 265.03, 265.04

(56) References Cited

U.S. PATENT DOCUMENTS 4,596,924 A * 6/1986 Watanabe ................... 235/379
5,035,415 A * 7/1991 Lee et al. .............. 271/265.03
5,443,257 A * 8/1995 Sakamori .................... 271/228
5,662,321 A * 9/1997 Borostyan et al. ....... 271/10.03
6,012,633 A * 1/2000 Ochiai et al. ............... 235/379
6,241,244 B1 * 6/2001 Modi ......................... 271/262
6,375,072 B2 * 4/2002 Watari et al. ............... 235/379
6,398,108 B1 * 6/2002 Swinton et al. ............. 235/379
6,520,375 B2 * 2/2003 Youn .......................... 221/197

* cited by examiner

*Primary Examiner*—Diane I. Lee
*Assistant Examiner*—Edwyn Labaze
(74) *Attorney, Agent, or Firm*—Birch, Stewart, Kolasch & Birch, LLP

(57) ABSTRACT

A media sensing method for an automatic media dispenser for discriminating discharged media using minimum sensors is able to sense media which are discharged in abnormal status by discriminating skew of media, length of the media, thickness of the media, and a distance between successively discharged media using a feed sensor and a rotary variable differential transducer (RVDT) sensor installed on left/right sides of a transferring path on which the media are transferred after being discharged from a cassette as responding to a cash withdrawal request, and thereby an area for disposing the sensors can be reduced to minimize the dispenser, and the circuit can be constructed simply using the minimum sensors to reduce fabrication cost for the automatic media dispenser.

19 Claims, 6 Drawing Sheets

MEDIA SENSING METHOD FOR AUTOMATIC MEDIA DISPENSER

BACKGROUND OF THE INVENTION

1. Field of the Invention

The present invention relates to an automatic media dispenser, and particularly, to a media sensing method for an automatic media dispenser which is able to discriminate thickness of media, length of media, distance between two media, and skew of media using minimum sensors in a mini automatic media dispenser.

2. Description of the Background Art

Generally, an automatic media dispenser is an apparatus by which a customer of a financial agency is able to perform operations of a teller such as withdrawal of cash and check, inquiry, and remittance, etc. Therefore, the automatic media dispenser is on-line connected to a host computer of the bank, and when the customer puts a bankbook, a cash card, or a credit card into a card/bankbook inlet, the withdrawal is made through an outlet of the automatic media dispenser.

The automatic media dispenser senses discharged media by discriminating the thickness, the length of media, distance between two media, and skew of media during the media are discharged.

FIGS. 1A through 1D are exemplary views showing examples of media sensed as normal/abnormal for respective media sensing factors.

In FIG. 1A, in case that two media are overlapped, the length is sensed to be longer than that of normal media, and therefore, the discharged media are decided as abnormal.

In FIG. 1B, the distance between presently discharged media and next media, and if the distance is shorter than that of normal case, the discharged media is decided as abnormal status.

In FIG. 1C, in case that the discharged media are skewed, the media are decided as abnormal status.

In FIG. 1D, the thickness of the media is measured, and if two media are overlapped, the media are decided as abnormal.

Accordingly, the automatic media dispenser uses various sensors in order to discriminate the media through the above factors. For example, a large automatic media dispenser uses a rotary variable differential transducer (RVDT) sensor for measuring the thickness of media, and four light sensors respectively including a luminous unit and a light-intercepting unit for discriminating the length of the media, the distance between two media, and the skew of the media. That is, the light sensor uses two feed sensors installed on left and right sides in the automatic media dispenser for discriminating the length of the media, uses a distance sensor for measuring the distance between media, and uses a skew sensor for discriminating the skew of media.

The media sensing method for the automatic media dispenser using the RVDT sensor and four light sensors will be described as follows.

FIG. 2 is a flow chart showing the media sensing method for the automatic media dispenser using the RVDT sensor and four light sensors according to the conventional art.

A controlling board of the automatic media dispenser checks whether or not respective sensors are operated normally when a request for cash withdrawal is transmitted from the customer, and operates an AC motor (main motor) by controlling it (S11~S17). At that time, if there is an error in the respective sensors and in the AC motor, processing disabled status is outputted (S45). Also, if there is no error in the AC motor, the DC motor is operated for discharging the media stored in a cassette (S19 and S21).

After that, the media discharged from the cassette are sensed in the two feed sensors for discriminating the length. Accordingly, the controlling board turns off the DC motor and the feed sensor (S23~S29).

The discrimination of length of the media is made by measuring on/off time of the right feed sensor among those feed sensors (S31). That is, during the media move along with a transferring path on which the feed sensor is installed, the voltage value of the light-intercepting unit in the feed sensor is maintained to be 0V during the media pass, and the voltage value is changed to +5V after the media passed. Therefore, the time of voltage change from +5V to 0V is measured to measure the length of the media.

After that, in case that the length of the media is normal, the distance and the skew are discriminated. That is, the distance between media and the skew of the media are discriminated by turning on the distance sensor and the skew sensor to detect the distance between the discharged media and the skew of the media (S33~S37). That is, in order to measure the distance between the first media and next media, the on/off time of the distance sensor for the first media and the on/off time of left feed sensor for next media are compared.

The skew of the media is measured by measuring time between turning-off of the feed sensor and turning-on of the distance sensor and of the skew sensor to measure the skew on right and left sides. At that time, if there is an error in the values detected from the sensors, the processing disabled status is outputted (S45).

In addition, if the distance and the skew are decided as normal, the distance sensor and the skew sensor are turned off and the thickness sensor is turned on to measure the thickness of the media, and then the media are discharged (S39~S41). At that time, if there is an error in the measured values, the processing disabled status is outputted (S45).

As described above, the media sensing method for the conventional large automatic media dispenser uses the RVDT sensor and four sensors detecting respective discrimination factors in order to discriminate the thickness, length of the discharged media, distance between successive media, and skew of the media. However, in case that the RVDT sensor and four sensors are applied to a mini automatic media dispenser, a sufficient area for disposing the sensors is required and circuit for processing signals of the sensors becomes complex, and therefore, cost price of the automatic media dispenser is increased.

SUMMARY OF THE INVENTION

Therefore, an object of the present invention is to provide a media sensing method for an automatic media dispenser which is able to discriminate discharged media using minimum sensor.

To achieve the object of the present invention, as embodied and broadly described herein, there is provided a media sensing method for an automatic media dispenser for discriminating media which are discharged in abnormal status by measuring skew of the media, length of the media, thickness of the media, and a distance between successive media using a rotary variable differential transducer (RVDT) sensor and a feed sensor installed on left/right sides of a transferring path through which the media are moved after being discharged from a cassette as responding to a request for cash withdrawal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
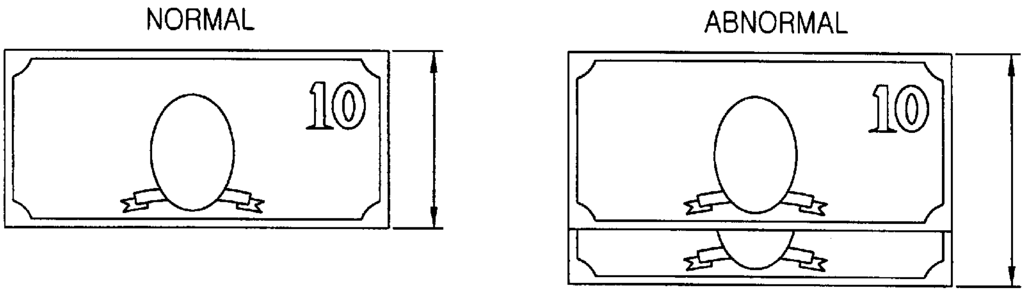
FIG. 1A PRIOR ART
FIGS. 1A through 1D are exemplary views showing cases of media sensed as normal or abnormal states by respective media discrimination factors.
Figure 1B:
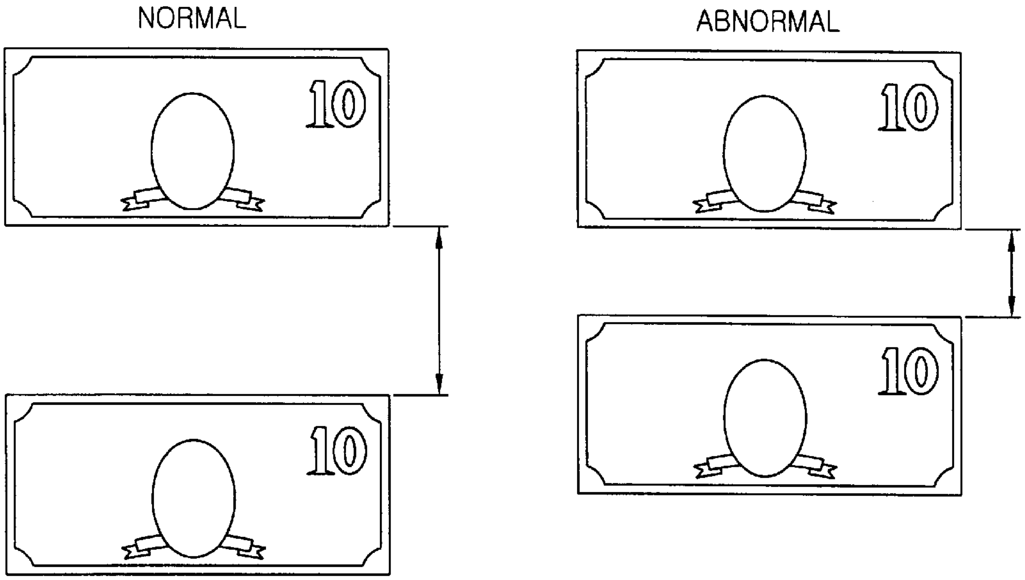
FIG. 1B PRIOR ART
Figure 1C:
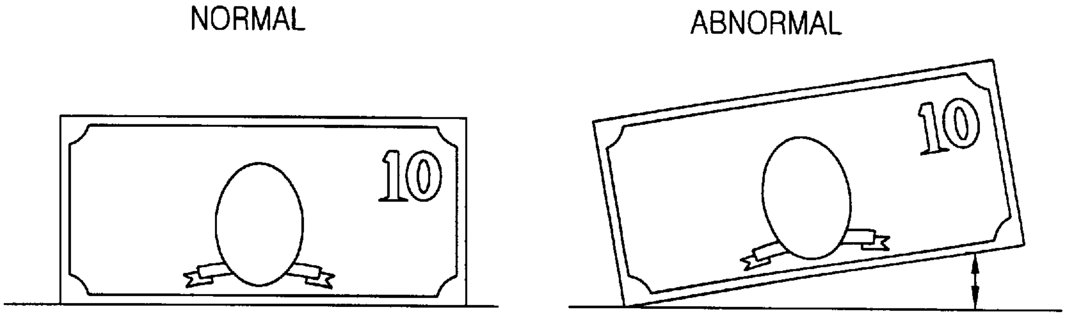
FIG. 1C PRIOR ART
Figure 1D:
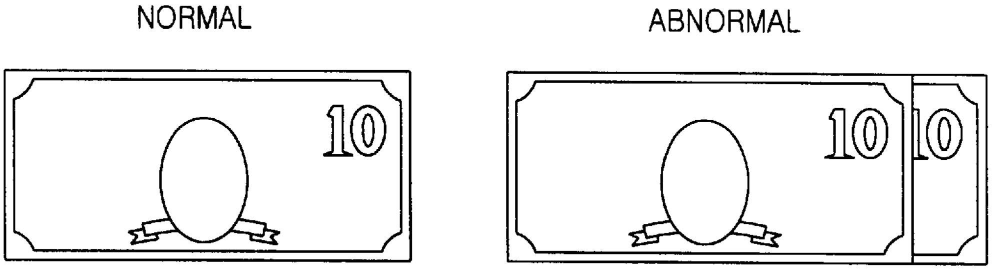
FIG. 1D PRIOR ART
Figure 2:
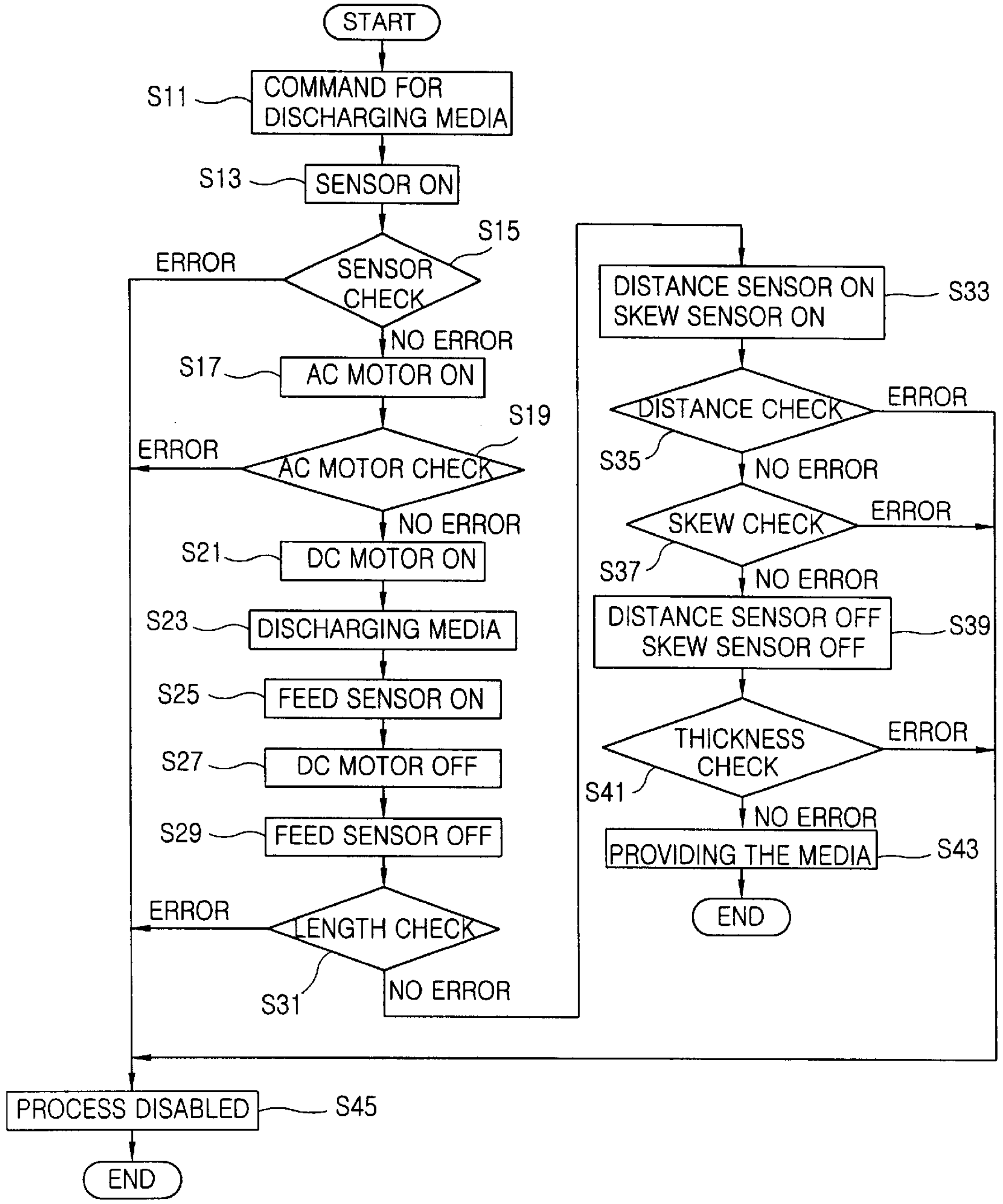
FIG. 2 PRIOR ART
FIG. 2 is a flow chart showing media sensing method for an automatic media dispenser using an RVDT sensor and four sensors according to the conventional art.
Figure 3:
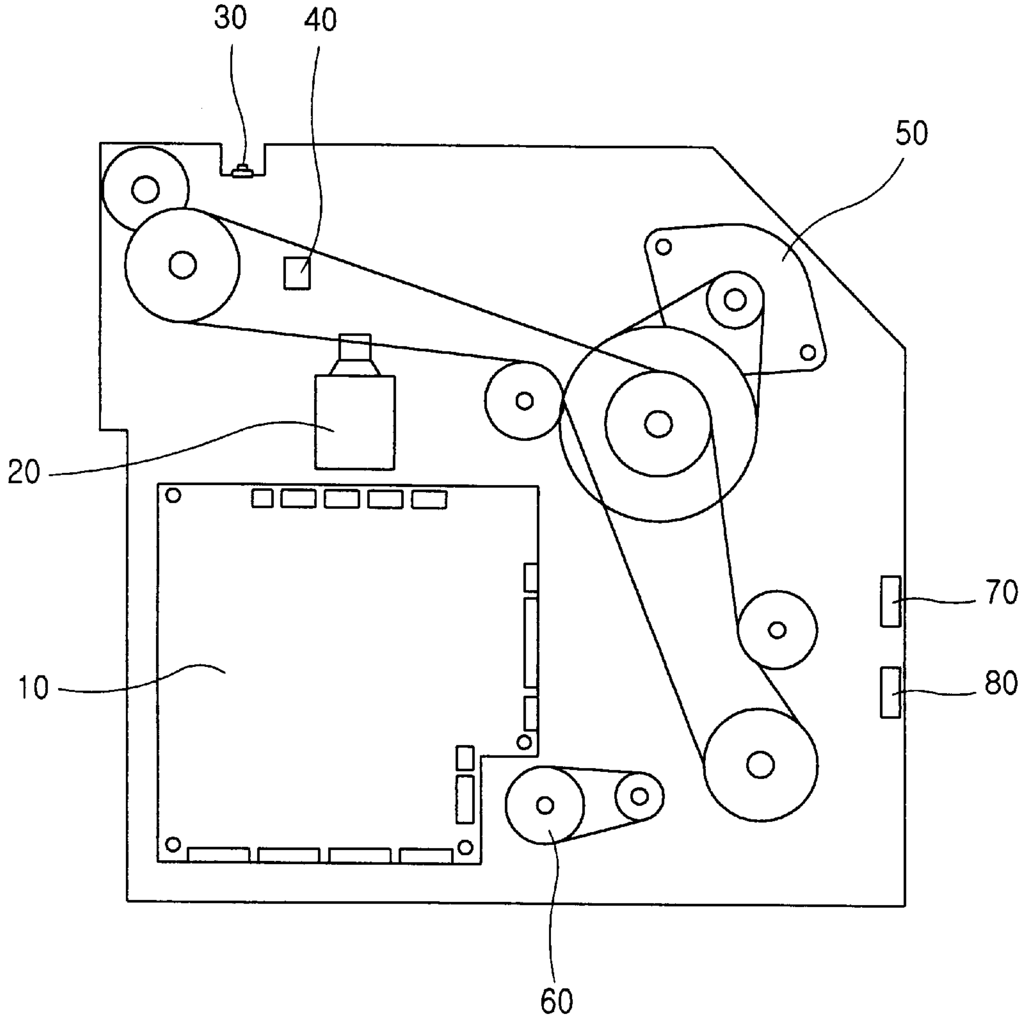
FIG. 3 is an exemplary view showing inside of an automatic media dispenser according to the present invention.

FIG. 3 is an exemplary view showing inside of an automatic media dispenser according to the present invention.

As shown therein, the automatic media dispenser comprises: a driving motor 50 being supplied electric source from a power supplying unit for supplying the power source to respective components of the automatic media dispenser and transmitting driving force for operating belts and gears; a solenoid 20 outputting a control signal for drawing the media back into a recall chamber in case that inferior media are detected or two or more media are detected on pathway of the media; a clutch 60 selectively transmitting the driving force generated from the driving motor 50 to a cassette, in which the media are stored, for discharging the media; a feed sensor 80 installed on pathway of the media for counting the media by sensing the media, or for outputting a sensing signal by discriminating status of the media; a rotary variable differential transducer (RVDT) sensor installed on the pathway of the media for outputting a sensing signal by discriminating media skewed toward left side, or by discriminating thickness of media; an eject sensor 30 for counting media which are discharged to outside; a reject sensor 40 for counting the recalled media; and a controlling board 10 for controlling operations of the respective components constituting the automatic media dispenser.

The above components will be described in more detail as follows. The driving motor 50 is a DC motor, and preferably, the driving motor 50 is a BLDC (Brushless DC) motor. And the clutch 60 transmits/blocks the driving force transmitted to a transferring roller connected to the cassette. Also, the feed sensor 80 is a light sensor comprising a luminous unit for irradiating the light, and a light-intercepting unit disposed apart from the luminous unit for sensing the light irradiated from the luminous unit. Therefore, when the media discharged from the cassette passes the transferring path on which the feed sensor is installed, the light irradiated from the luminous unit is blocked by the media, and the light-intercepting unit senses it and outputs the sensing signal to the controlling board. For example, the voltage value of the light-intercepting unit in the feed sensor is maintained to be 0V before the media passes completely, and is changed to +5V after the media passed. Therefore, the time when the voltage value is changed from +5V to 0V can be measured. In addition, a sensing portion of the RVDT sensor 70 is pushed up as much as the thickness of the media, and the thickness of the media is measured by calculating a difference between the sensing signal at present and the sensing signal which is set in advance. And the eject sensor 30 is installed on a cash providing chamber for drawing the media out, and senses the withdrawn media and outputs a control signal for turning the clutch on. In addition, the reject sensor 40 is installed on one side of the recall chamber in which the media of abnormal states are stored, and senses the recalled media after being decided as abnormal states by the RVDT sensor 70 and by the feed sensor 80.

Operations of the automatic media dispenser constructed above will be described as follows.

The controlling board 10 checks whether or not the respective sensors are in normal states, and checks states of the driving motor 50 and of the solenoid 20 according to a request for media withdrawal of a customer. At that time, the solenoid 20 outputs a sensing signal to the controlling board 10 when remained media existed on the pathway are sensed, and the controlling board 10 outputs a control signal to the driving motor 50 for recalling the remained media. Therefore, the reject sensor 40 senses and counts the recalled media, and outputs a control signal for performing normal media withdrawal operation to the controlling board 10.

After that, the clutch 50 for transmitting the driving force to the transferring roller which is connected to the cassette is operated in order to discharge the media from the cassette where the media are stored, and thereby, the media are discharged from the cassette.

On the other hand, the automatic media dispenser includes the feed sensor 80 and the RVDT sensor 70 on left/right sides of a transferring path through which the media are discharged in order to sense the media discharged from the cassette.

If the RVDT sensor 70 recognizes the media before the feed sensor 80 recognizes the media during the media discharged from the cassette passes along with the transferring path, the media are decided as skewed toward left side.

On the other hand, if the feed sensor 80 recognizes the media earlier than the RVDT sensor 70, the feed sensor 80 outputs a control signal for turning off the clutch 60 to the controlling board 10. Therefore, the clutch 60 blocks the driving force transmitted to the transferring roller connected to the cassette.

The feed sensor 70 measures the on/off time of the feed sensor 80 to discriminate the length of the media, and decides whether or not the media are skewed toward right side.

After that, the RVDT sensor 80 measures the thickness of the media, and the feed sensor measures the distance between media which are discharged successively. At that time, the controlling board 10 compares the sensing signal for the thickness of the media applied from the RVDT sensor

70 to the sensing signal for the thickness of the media which is pre-set, and thereby, the thickness of the media is discriminated. For example, if the value applied from the RVDT sensor 70 is larger than the pre-set value, the controlling board 10 decides that two or more overlapped media are transferred. Therefore, the controlling board 10 outputs a control signal for recalling the media by operating the solenoid 20.

Lastly, if the abnormal status is detected during the respective discrimination processes, the controlling board 10 outputs a control signal for turning the solenoid 20 on to recall the media back into the recall chamber. After that, the reject sensor 40 senses the recalled media, counts the recalled media, and outputs the sensing signal to the controlling board 10. Therefore, the controlling board 10 decides that the recalling process of the media is completed, and then outputs a control signal for re-performing the normal media withdrawal operation.

According to the automatic media dispenser of the present invention, information on the size of the media can be stored in a microcomputer included in the controlling board 10 after changing the information, and it can be applied to the discrimination processes of the respective sensors, and thereby, the media of various countries can be discriminated. For example, the automatic media dispenser can be applied to bills having different sizes according to countries, to gift certificates, and to checks.

Figure 4:
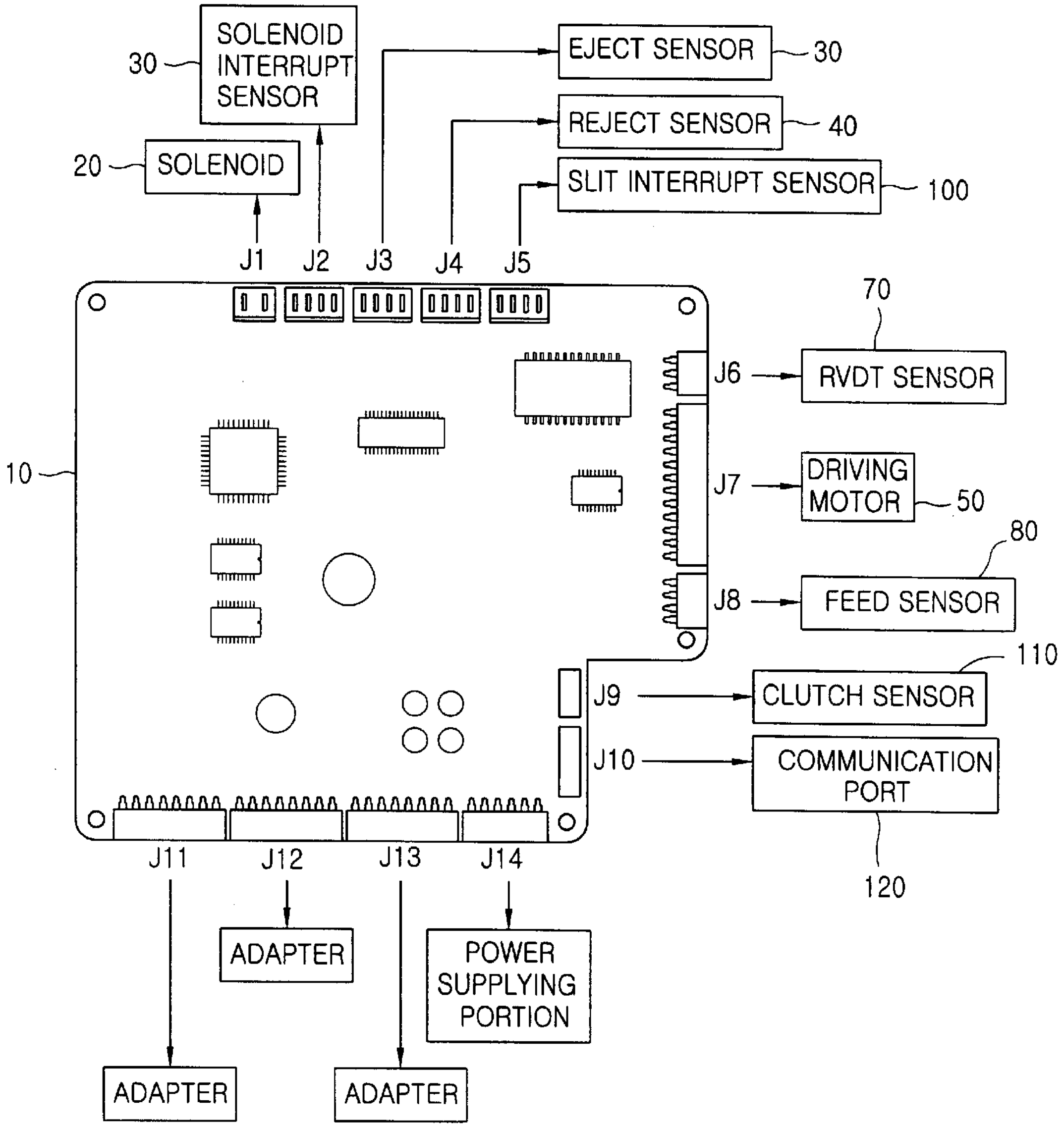
FIG. 4 is a detailed block diagram showing respective sensors and a controlling board connected thereto according to the present invention.

FIG. 4 is a detailed block diagram showing respective sensors and the controlling board connected thereto according to the present invention.

As shown therein, the controlling board 10 controls operations of the solenoid 20, a solenoid interrupt sensor 30, the eject sensor 30, the reject sensor 40, a slit interrupt sensor 100, the RVDT sensor 70, the driving motor 50, the feed sensor 80, a clutch sensor 110, a communication port 120, an adapter 130, and the power supplying portion 140. That is, the controlling board 10 is inputted the sensing signals applied from the respective sensors and outputs the control signal for turning on/off the clutch 60. Especially, the controlling board 10 outputs the control signal for turning off the clutch 60 according to the sensing signal applied from the RVDT sensor and from the feed sensor 80, and outputs the control signal for turning on the clutch 60 according to the sensing signal applied from the eject sensor 30.

Figure 5:
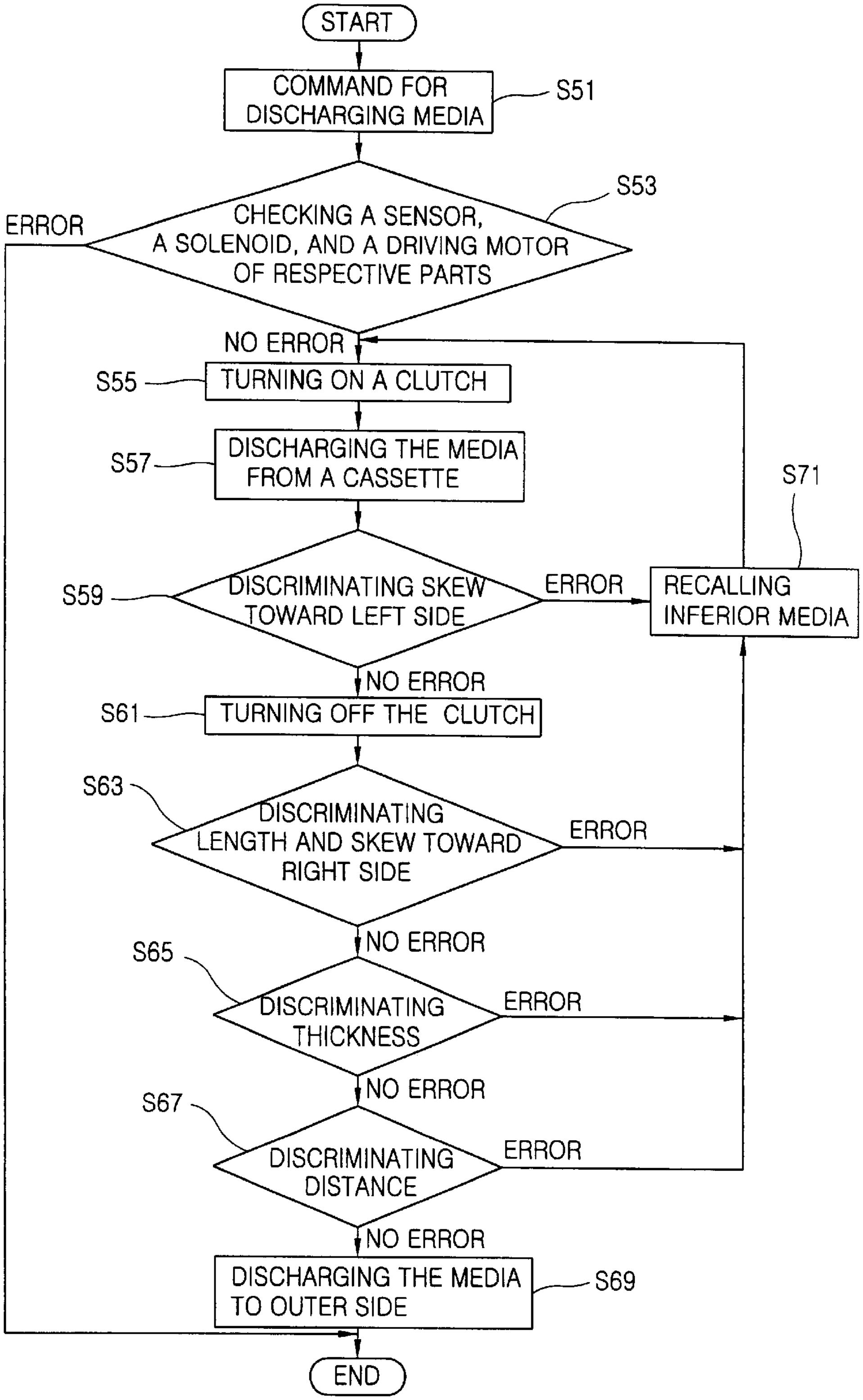
FIG. 5 is a flow chart showing media sensing method for an automatic media dispenser according to the present invention.

FIG. 5 is a flow chart showing the sensing method for the automatic media dispenser according to the present invention.

As shown therein, in case that there is a request for cash withdrawal of the customer, the controlling board 10 outputs a command for discharging media, and accordingly, the controlling board 10 checks whether or not there is an error in the respective sensors, the solenoid 20, and in the driving motor 50 (S51, S53). That is, the controlling board 10 turns on the solenoid 20 and operates the driving motor 50 in case that there is no error in the RVDT sensor 70 and in the feed sensor 80. At that time, if there are remained media existed on pathway, the solenoid 20 outputs a control signal for recalling the remained media to the driving motor 50 to recall the remained media. In addition, the reject sensor 40 counts the recalled media, and outputs a control signal notifying the normal status to the controlling board 10 when the recalling is completed.

After that, the clutch 60 is turned on to discharge the media from the cassette in which the media are stored, and the media are discharged by the driving force of the driving motor 50 (S55, S57).

Skew toward left side of the media discharged from the cassette can be decided by the sensing order of the RVDT sensor 70 and the feed sensor 80 (S59). After that, the clutch 60 blocks the driving force transmitted to the transferring roller which is connected to the cassette to block the discharged media (S61). In addition, the length of the media and the skew toward right side of the media can be measured at the same time using the feed sensor 80 (S63). The thickness of the media is measured using the RVDT sensor (S65). The distance of the media can be decided by measuring the distance between first media and next media using the feed sensor 80 (S67). Therefore, if the media are decided as normal status in the above respective processes, the media are discharged to outer side (S69).

On the other hand, media of abnormal status are detected in the respective discrimination processes, the solenoid 20 is turned on to recall the abnormal media to the recall chamber (S71). After that, the reject sensor 40 senses the recalled media and applies a sensing signal to the controlling board 10. Therefore, the reject sensor 40 counts the recalled media, and at the same time, completes the recalling operation. After that, normal media discharging operation is performed again.

The media sensing method of the RVDT sensor 70 and of the feed sensor 80 will be described in detail as follows.

The skew to left side of the media is measured using the RVDT sensor 70. That is, between the feed sensor 80 and the RVDT sensor 70 installed on left/right sides of the pathway on which the media are moved, when the media are sensed by the RVDT sensor 70 before the feed sensor is turned on, the media can be decided as skewed toward left side. On the other hand, the skew to right side of the media can be discriminated by measuring on/off time of the feed sensor 80 during the media move along with the transferring path on which the feed sensor 80 is located. That is, if the media are skewed toward the right side, the on/off time of the feed sensor 80 is reduced than that of normal status.

In case that a plurality of media overlapped on some parts are discharged, the on/off time of the feed sensor 80 is longer than that of the normal status. Therefore, during the media are moved along with the transferring path, the length of the media is discriminated by measuring the on/off time of the feed sensor 80.

When the media are moved between the RVDT sensor 70 during the media are moved along with the transferring path, a sensing unit of the RVDT sensor 70 is pushed up as much as the thickness of the media, and accordingly, the thickness is measured by a difference between the present sensing signal value of the RVDT sensor 70 and pre-set sensing signal value.

In order to measure the distance between the first media and the next media, the on/off time of the feed sensor 80 for the first media and the turning-on time of the feed sensor 80 for the next media are compared to know the distance between the media.

As described above, according to the present invention, the skew of the media, the length of the media, the thickness of the media, and the distance between successive media are discriminated using the RVDT sensor 70 and the feed sensor 80, and thereby, the discharged media can be discriminated using minimum sensors. Therefore, according to the present invention, an area for disposing the sensors can be reduced to minimize the dispenser, and the circuit can be constructed simply using the minimum sensor to reduce fabrication cost for the automatic media dispenser.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A media sensing method for an automatic media dispenser for sensing media discharged in abnormal status by discriminating skew of media, length of the media, thickness of the media, and a distance between successively discharged media using a feed sensor and a rotary variable differential transducer (RVDT) sensor installed on left/right sides of a transferring path on which the media are transferred after being discharged from a cassette as responding to a cash withdrawal request.

2. The method of claim 1 further comprising the steps of:

checking whether or not there is an error in the feed sensor and in the RVDT sensor as corresponding to the cash withdrawal request of a customer;

discharging the media by a driving force transmitted to a transferring roller connected to the cassette; and recalling the media when media of abnormal status are detected in respective discrimination processes.

3. The method of claim 1, wherein the skew discrimination toward left side of the media is decided according to sensing order of the RVDT sensor and of the feed sensor.

4. The method of claim 3, wherein the sensing order is that the media is sensed by the RVDT sensor before the feed sensor is turned on, between the feed sensor and the RVDT sensor installed on left/right sides of the transferring path on which the media are moved.

5. The method of claim 3, wherein the driving force transmitted to the transferring roller connected to the cassette, in which the media are stored, is blocked when the feed sensor senses the media earlier.

6. The method of claim 1, wherein the skew discrimination to right side of the media is decided by measuring on/off time of the feed sensor during the media are moved along with the transferring path on which the feed sensor is located.

7. The method of claim 1, wherein the length discrimination and the skew to right side discrimination are measured at a same time.

8. The method of claim 7, wherein the length discrimination is made by comparing the on/off time of the feed sensor measured during the media are moved along with the transferring path and on/off time of the feed sensor of normal status which is pre-set.

9. The method of claim 1, wherein a sensing portion of the RVDT sensor is pushed up as much as the thickness of the media when the media are transferred between the RVDT sensor, and accordingly, the thickness of the media is discriminated by a difference between a present sensing signal value of the RVDT sensor and a sensing signal value which is set in advance.

10. The method of claim 1, wherein the distance between media is decided by comparing on/off time of the feed sensor for a first media to turning-on time of the feed sensor for next media.

11. The method of claim 1, wherein if media of abnormal status are detected from the respective discrimination processes, the media are recalled to a recall chamber and the recalled media are counted.

12. The method of claim 1, wherein the feed sensor is a light sensor comprising a luminous unit for irradiating light, and a light-intercepting unit disposed apart a predetermined distance from the luminous unit for sensing the light irradiated from the luminous unit.

13. The method of claim 12, wherein an output of the light-intercepting unit in the feed sensor is 5V when the media are not sensed, and the output of the light-intercepting unit is 0V when the light irradiated from the luminous unit is blocked by the media during the media discharged from the cassette in which the media are stored pass the transferring path on which the feed sensor is installed.

14. A media sensing method for an automatic media dispenser comprising the steps of:

deciding skew to left side of media discharged from a cassette in which the media are stored according to a sensing order of a feed sensor and a rotary variable differential transducer (RVDT) sensor installed on left/right sides of a transferring path on which the media are moved as corresponding to a cash withdrawal request of a customer;

deciding length of the media and the skew to right side of the media by measuring on/off time of the feed sensor during the media are moved along with the transferring path;

deciding thickness of the media by measuring a difference between a sensing signal value of the RVDT sensor which is set in advance and a sensing signal value of the RVDT sensor when a sensing portion is pushed up as much as the thickness of the media; and deciding a distance between the media by comparing on/off time of the feed sensor for a first media and turning-on time of the feed sensor for next media.

15. The method of claim 14, wherein the discharged media are blocked by blocking a driving force transmitted to a transferring roller connected to the cassette after the skew toward left side of the media is discriminated.

16. The method of claim 14 further comprising the steps of:

checking whether or not there is an error in the sensor, a solenoid, and a driving motor constructing respective parts as corresponding to the cash withdrawal request of the customer; and discharging the media by the driving force transmitted to the transferring roller connected to the cassette.

17. The method of claim 16, wherein the solenoid outputs a control signal for recalling remained media to a motor driving portion to recall the remained media if there are remained media on the pathway in the step of checking.

18. The method of claim 16, wherein the driving motor is DC motor, and preferably, the driving motor is a Brushless DC (BLDC) motor.

19. The method of claim 14 further comprising the steps of:

recalling the media to a recall chamber if the media are decided as abnormal status during the respective discrimination processes; and sensing and counting the recalled media.

* * * * *